United States Patent [19]

Benjamin et al.

[11] Patent Number: 4,677,588
[45] Date of Patent: Jun. 30, 1987

[54] NETWORK INTERCONNECTION WITHOUT INTEGRATION

[75] Inventors: Jay H. Benjamin, Kingston, N.Y.; James P. Gray, Chapel Hill, N.C.; Royal C. Hayward, Cary, N.C.; Matthew L. Hess, Raleigh, N.C.; Frederick E. McGriff, Gechingen, Fed. Rep. of Germany; Ellis L. Miller, Raleigh, N.C.; Robert A. Weingarten, Highland Mills, N.Y.

[73] Assignee: International Business Machines Corp., Armonk, N.Y.

[21] Appl. No.: 551,449

[22] Filed: Nov. 14, 1983

[51] Int. Cl.⁴ .......................................... G06F 13/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,654,603 | 4/1972 | Gunning et al. | 364/200 |
| 4,155,117 | 5/1979 | Mitchell, Jr. et al. | 364/200 |
| 4,231,086 | 10/1980 | Tarbox et al. | 364/200 |
| 4,564,900 | 1/1986 | Smitt | 364/200 |

Primary Examiner—Thomas M. Heckler
Attorney, Agent, or Firm—Joscelyn G. Cockburn

[57] ABSTRACT

A facility called "Gateway" is used to interconnect a plurality of independently controlled communication networks so that logical units (LUs) in the networks can communicate with one another without any changes to the network. The gateway includes a programmable device or devices which establish and monitor cross network sessions and for each formatted message, on the session, the programmable device changes the contents on the request unit (RU) and/or the transmission header (TH) fields so that data is delivered to a target LU. The changes include address translation within the TH field, and/or address and name translation within the RU field.

12 Claims, 14 Drawing Figures

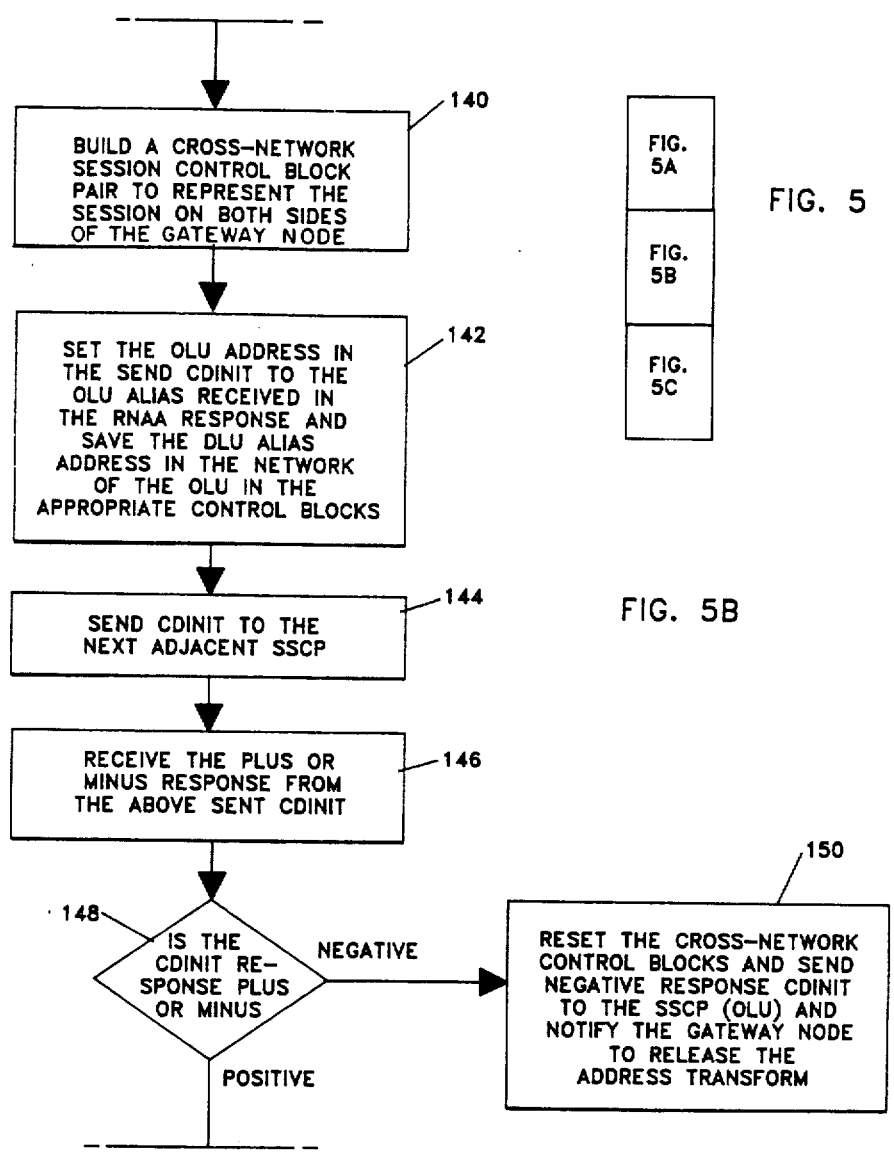

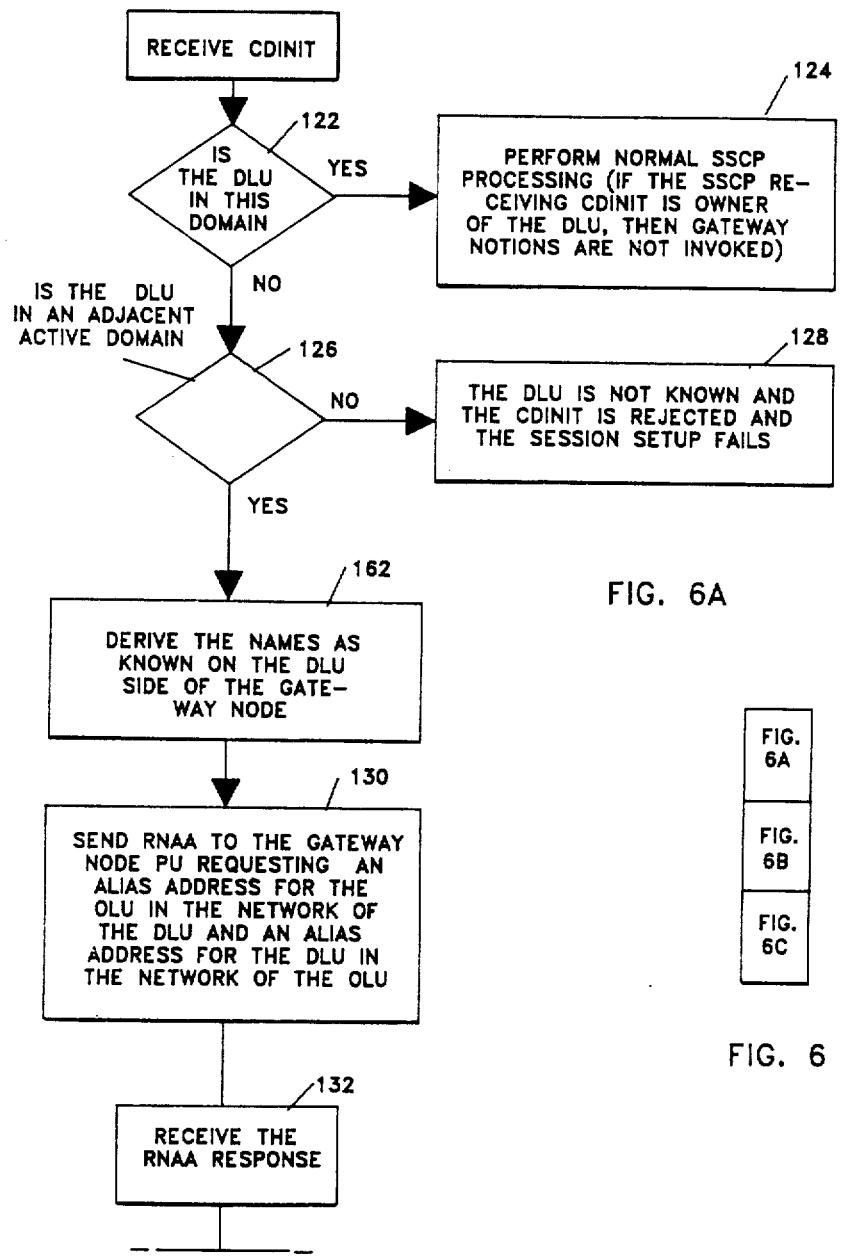

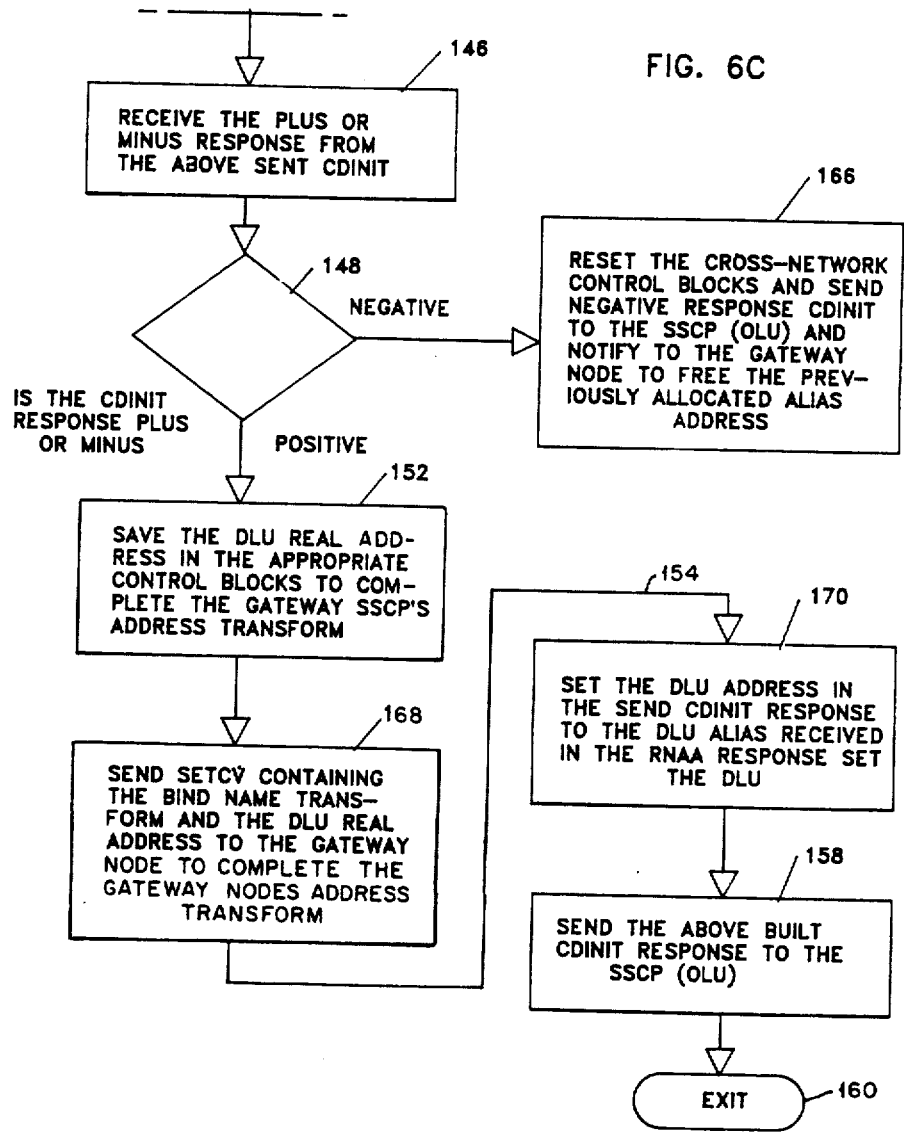

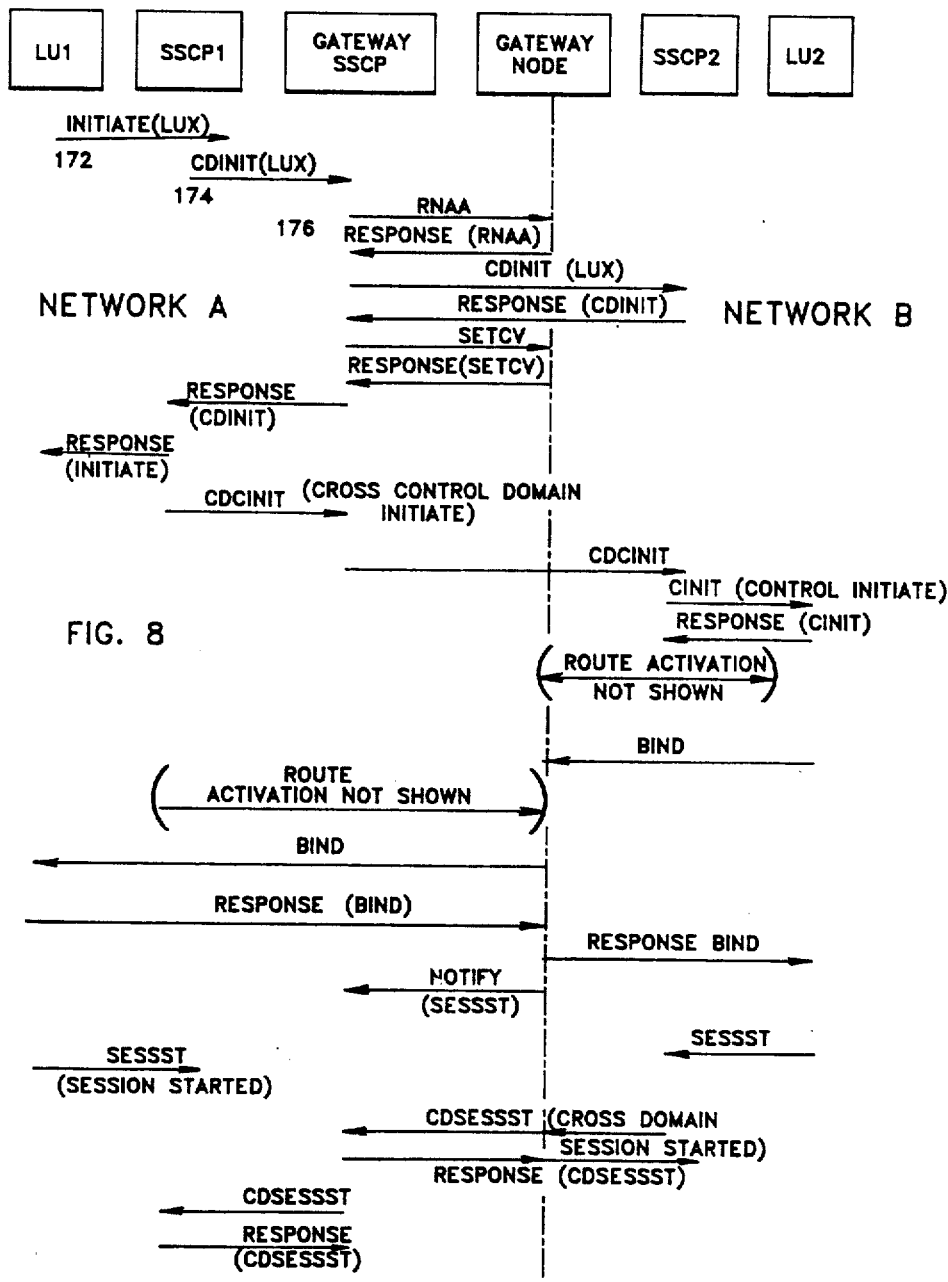

NETWORK INTERCONNECTION WITHOUT INTEGRATION

BACKGROUND OF THE INVENTION (a) Field of the Invention

The present invention relates to computer network systems in general and more particularly to the management of a multiple-network system.

(b) Prior Art

The use of computer network systems for processing and transmitting data is well known in the prior art. A typical computer network system consists of at least one host computer running under some type of operating system, communication controllers, a communication medium and a plurality of end users (terminals, printers, displays, etc.). The host computer is connected, via a channel, to a first set of the communication controllers. The communication controller interfaces with the communication medium. The communication medium may be telephone lines, satellites, etc. A second set of communication controllers is connected to the communication medium and is connected by one or more device controllers to the end user devices. By entering a request at a user terminal, a user may extract data from the host computer.

In addition to the physical structure, the prior art computing systems are controlled by a system architecture which ensures the orderly flow of information throughout the system. The prior art describes several types of architectures. For example, an overview of the architecture used in computer networks is given in an article entitled, "Computer Network Architecture," by S. Wecker in *Computer*, September 1979. Another overview, including a description of System Network Architecture (SNA) is given in an article entitled, "An Introduction to Network Architectures and Protocols," by P. E. Green and printed in the IBM System Journal, Vol. 18, No. 2, 1979. In these articles, the various computer networks such as SNA, DMA, ARPANET, etc. are described by means of hierarchical architectural layers, where the lowest layer relates to the physical communication lines interconnecting various user nodes of the network and where the highest level concerns the conversation per se between the various end users of the network.

In an attempt to standardize network architecture, the International Organization for Standardization (ISO) has adopted a model which is described by Herbert Zimmerman in an article entitled, "OSI Reference Model - the ISO Model of Architecture for Open Systems Interconnections," IEEE Transactions on Communications, April 1980. The model architecture consists of seven layers, namely: physical, data link, network, transport, sessions, presentation and application layers. The present invention mainly concerns the session layer which relates to the establishment, termination and control of sessions between two end users.

In order to enable resources in one network to communicate with resources in another network, the prior art utilizes a facility called a gateway for interconnecting the networks. For example, the International Telephone and Telegraph Consultant Committee (CCITT) in an article entitled, "Recommendations X.75 and X.121 of CCITT," 1980 Plenary of the International Telephone and Telegraph Consultant Committee, has defined an interface (X.75) for interconnecting public data network that offers an X.25 user interface. This approach uses a global addressing scheme (X.121) that is apparent at the user interface in each network.

In another prior art approach, the Advance Research Projects Agency (ARPA) interconnects networks using the ARPA-specified virtual call protocol between gateways and routes datagrams from gateway to gateway as local network packets that include a global network address for the destination. A more detailed description of this approach is given in the following articles: C. Sunshine, "Current Trends in Network Computer Network Interconnection," Eurocomp 78; Proceedings of the European Computer Congress, London, England, May 9-12, 1978, On-Line Conference Ltd., Uxbridge, England (1978), pp. 465-472, and F. A. Tobagi, "Multi-Access Protocols in Packet Communication Systems," IEEE Transaction on Communications Com-28, No. 4, 468-488 (April 1980).

Although the above interconnecting gateways work well for their intended purpose, implementation appears to be cumbersome and difficult. It is believed that this drawback stems from the fact that a global address scheme is used. This makes it difficult to use the prior art gateway to interconnect existing independently controlled networks. The use of a global address suggests that all previously assigned addresses have to be redefined to eliminate possible conflicts. As the use of computer networks increases, the desirability for a more efficient approach to interconnect networks will inevitably increase.

SUMMARY OF THE PRESENT INVENTION

It is a general object of the present invention to provide a more efficient method for interconnecting networks.

It is another object of the present invention to interconnect pre-existing networks without interrupting pre-existing controls.

This and other objects are achieved by providing a gateway at the boundaries of independently controlled networks. The gateway includes a Gateway System Services Control Point (GW-SSCP) and a Gateway Node (GW-NCP). The GW-SSCP is implemented in software and runs in a host computer. Likewise, the GW-NCP is implemented in software and runs in a communication controller. The host computer is coupled to the communication controller via a channel (direct connection) and/or indirectly by an SNA network.

The GW-SSCP is enhanced with a rerouting function and translation function. The rerouting function is used to reroute session services requests between SSCPs in separate networks. The translation function is used to perform the appropriate address translations within the requests. In addition, the GW-NCP is structured so that it appears to be a sub-area in each network that it attaches. As messages are sent between the networks, the GW-NCP translates the network addresses in the transmission headers of the messages.

Network interconnection is achieved when an initiating logical unit (LU) in one network is allowed to communicate with another logical unit in another network. The interconnection requires the establishment of a cross-network session followed by the flow of messages on the session. The establishment of a cross-network session begins with an LU issuing an Initiate Request message. The message includes the name and address of the Origin LU (OLU) and the name of the Destination LU (DLU). The GW-SSCP analyzes the message and determines the network that owns the DLU. A series of control messages flows between the GW-SSCP and the GW-NCP. As a result of the message flow, a session is set up between the DLU and OLU. Thereafter, messages are exchanged between the LUs. The GW-NCP changes the addresses in the transmission header so that the messages are delivered to the proper LU.

In one feature of the invention, the GW-SSCP is implemented in one of the host computers of the interconnecting networks.

In another feature of the invention, the LUs are allowed to use alias names to identify a session partner. The GW-SSCP is provided with a name translation function which it utilizes to translate the alias name into real names. By using alias names, the sub-networks of an interconnected network can use common names. This feature further enhances the individuality of each sub-network.

The foregoing features and advantages of the invention will be more fully described in the accompanying drawings.

BRIEF DESCRIPTION OF THE DRAWINGS

FIGS. 5 and 5A-5C show a flow chart for an algorithm used in implementing the network interconnect function. This flow chart involves an address translation function only.

FIGS. 6 and 6A-6C show a flow chart for implementing the invention with the address translation and name translation function.

FIG. 8 shows an alternate way for representing the invention.

DETAILED DESCRIPTION OF THE PREFERRED EMBODIMENT

Although the present invention is not restricted to any specific type of computer network, it works well with the IBM SNA network which uses the SNA architecture and protocol and as such will be described in that environment. However, this should not be construed as a limitation on the scope of the present invention since it is within the skill of one skilled in the computing art to use the invention as is disclosed or with slight modification to interconnect networks other than the IBM SNA network.

A typical SNA network is described in the IBM manual, "Advanced Communication Functions for Virtual Telecommunications Access Methods," GC27-0463-2, February 1981. The SNA network utilizes the system network architecture (SNA) to allow terminals, application programs and other logical resources to communicate with one another using SNA entities called logical units. A more detailed description of the architecture and network is given in the referenced manual and is incorporated herein by reference.

Figure 1:
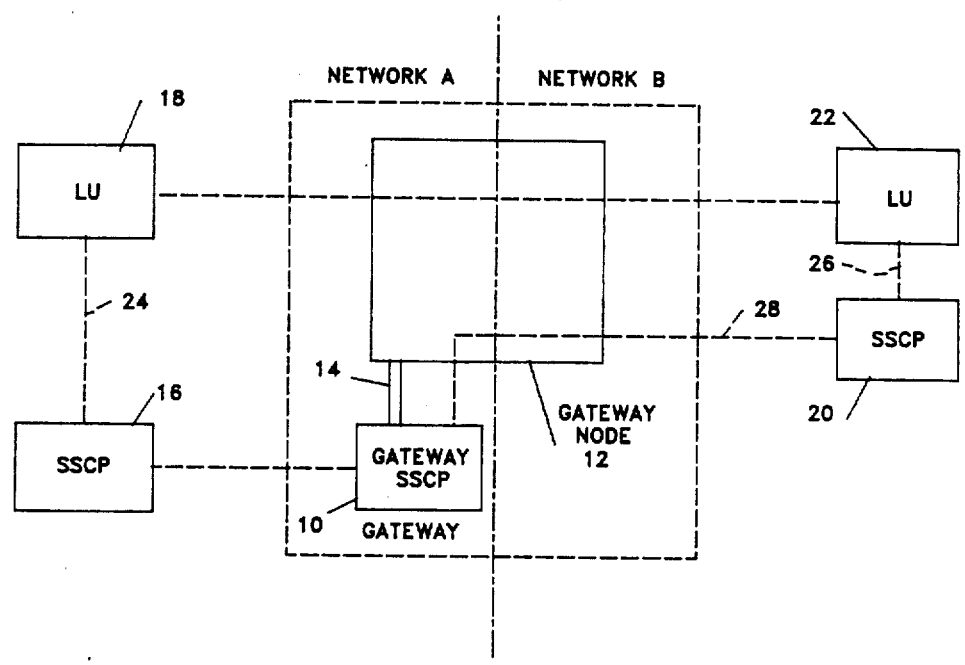
FIG. 1 is a block diagram showing the components of the gateway according to the present invention.

FIG. 1 is a conceptual representation of the present invention. The invention is comprised of a gateway node interconnecting network A and network B. The gateway node is placed on the boundaries of the two networks. It should be noted that although FIG. 1 shows the interconnection of two networks the showing is only symbolic and does not limit the number of networks which the invention can interconnect. In essence, the node may be used to interconnect as many as 255 separate networks. The gateway includes a gateway SSCP identified by numeral 10 and a gateway node identified by numeral 12. A channel identified by numeral 14 interconnects the gateway SSCP 10 to the gateway node 12. Alternatively, an SNA link could have been used to connect the gateway SSCP to the gateway node. The gateway SSCP can be any conventional host computer. In the preferred embodiment of this invention the gateway SSCP 10 is an IBM System 370 class processor. The structure and instruction set of this computer is well known in the prior art and as such the details will not be given. A description of the IBM 370 class processors is given in "Microprogramming Principles and Practices" by Samir S. Husson (Prentice Hall, 1970), "Advanced Communication Function for a Network Control Program for IBM 3725 and IBM 3705 . . . ," (GC-3071 and GC30-3058), and "General Information for Virtual Telecommunication Access Method" (GC27-0463 and GC27-0462). The cited literature is incorporated herein by reference.

Similarly, the gateway node can be any conventional communication controller. The preferred embodiment of this invention, the gateway node, is the IBM 3705 and/or 3725 communication controller. The details of this controller are well known in the prior art and will not be given. Suffice it to say that the controllers uses the UC1 processor and a detailed description is given in the above-referenced manual.

Each of the networks A and B is managed and controlled as separate entities. To this end, network A is fitted with at least one SSCP identified by numeral 16. The SSCP is the control point for a plurality of addressable units, only one of which is shown in network A and identified as LU 18. Similarly, network B is provided with SSCP 20 and LU 22. LU 18 is located in the domain of SSCP 16. Likewise, LU 22 is located in the domain of SSCP 20. Communication across network boundaries is hereinafter referred to as internetwork communication. Communication within a network boundary is referred to as intranetwork communication. For intranetwork communication an LU such as LU 18 or LU 22 generates and transmits a session initiation request to SSCP 16 and SSCP 20 over logical communication routes 24 and 26, respectively.

It is assumed that LU 18 wants to communicate with LU 22. Both LUs are in separately controlled networks. The invention allows such a communication without affecting the configuration and management of either network. The procedure for such an interconnection is that a session has to be established between LU 18 and LU 22. Once the session is established, messages can flow freely on the session. The session establishment begins with LU 18 preparing and transmitting an initiation request (to be described later) to SSCP 16. SSCP 16 receives and interprets the message. After interpretation, SSCP 16 determines that LU 22 is not in its domain. SSCP 16 prepares and transmits a cross domain session initiation request to gateway SSCP 10. The gateway SSCP 10 generates and exchanges a set of control messages between the gateway node and itself. As a result of these messages, an address transform is established in the gateway node. In other words, the address of LU 22 is placed in the address field. Similarly, routing information, and name translation are performed by SSCP 10. The gateway node changes the address in the transmission header (to be described hereinafter) and as a result a session is established between LU 18 and LU 22. The broken line identified by numeral 28 is a logical representation of the session. Once the session is established, messages flowing between LU 18 and LU 22 pass through gateway node 12 where the address translation in the transmission header is performed. It should be noted that the gateway SSCP 10 together with the gateway node 12 also participates in the establishment and discontinuation of sessions. However, actual message flow between the LUs involves the gateway node only.

Figure 2:
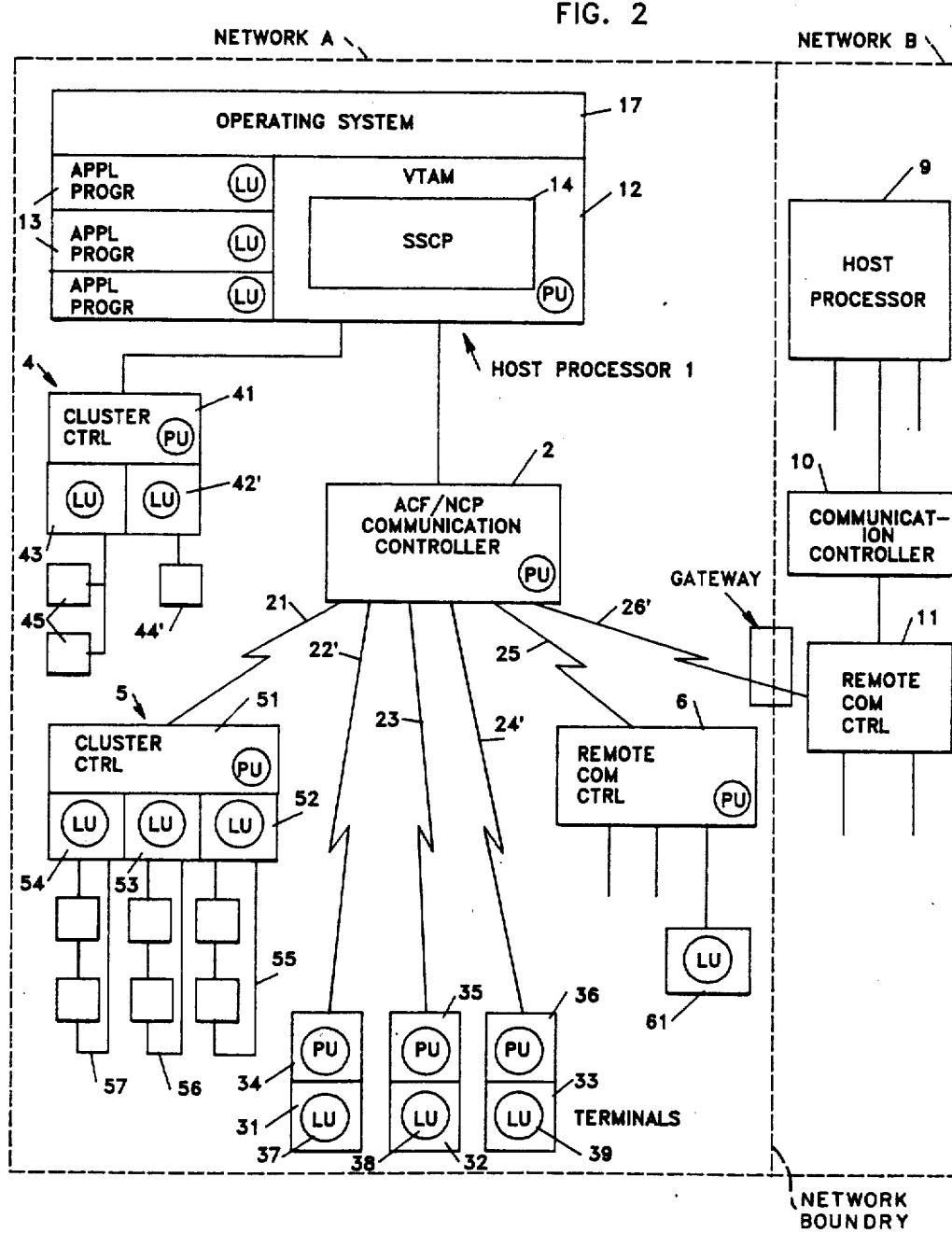
FIG. 2 shows a block diagram of a computer network system. The host computer and the communications controller are similar to the components of FIG. 1.

FIG. 2 shows a detailed schematic of network A and network B. Since both networks are substantially the same, the details are given for network A only with a skeleton showing to represent the components of network B. In order to simplify the description, the gateway of FIG. 1 is shown as a single box. In actuality and as shown in FIG. 1, the Gateway is composed of several components. The computer networks include a host processor 1 located in network A and a host processor 9 located in network B. The host processors may be any conventional host computer. In the preferred embodiment of this invention, the host computers are IBM System 370. These host computers are identical to the host computer used as the gateway SSCP. The host processor 1 includes an operating system 17, a plurality of application programs 13, and a virtual telecommunication access method (VTAM) 12. VTAM contains a system service control point (SSCP) component 14. VTAM is an IBM communication access method which is well known and as such details will not be given. Suffice it to say that the system services control point 14 is a component of VTAM that manages the network. The SSCP performs functions such as bringing up the network and shutting it down, assisting in establishing and terminating the communication between network addressable units (intranetwork session) and reacting to network problems, such as failure of a link or control unit. To perform these functions, the SSCP must be able to communication with physical units PU and logical units LU in its own domain. A more detailed description of VTAM/SSCP is given in the above referenced manuals.

Still referring to FIG. 2, a communication controller 2 is attached to the host 1 via a channel 16, and a local cluster controller 4 is attached over a channel 15 to the host. The communication controller 2 is a transmission control unit with processing controlled by advanced communications function (ACF) network control program (NCP) that resides in its storage. The ACF/NCP is well known to those skilled in the art, and as such details will not be given. Suffice it to say the main purpose of the network control program is to transmit data received from the host processor 1 to terminals, clusters, or other NCPs and to receive data from the terminals, clusters, or other NCPs, and sends it to the host. The NCP can process the data in various ways as it passes through the controller. In controlling the flow of data, the NCP must interact with portions of the controller hardware. On the line side, the NCP interacts with the communications scanner and on the channel side it interacts with the channel adapter. A more detailed description of the communication controller and its associated control program is given in the above referenced manual.

The communication controller 2 is connected to a remote cluster controller 5 over a synchronous data link control (SDLC) link 21. The communication controller 2 is also connected over a link 25 to a remote communication controller 6 and by means of links 22'-24' to terminals 31, 32 and 33. A cross network link 26' connects the communication controller 2 with a remote communication controller 11 in network B. In the network B there is also shown a communication controller 10 connected between the host processor 9 and the remote communication controller 11. It should be noted that the communication controller 2 and its control program are substantially the same as the gateway node.

Each element, in the network of FIG. 2, that can send or receive data is assigned a network address and is known as a network addressable unit (NAU). The network address uniquely identifies the element, regardless of whether the element is a device such as a terminal or terminal control unit, program such as an application program in a cluster controller or in a host processor, or a portion of an access method, such as VTAM. The network address contains information necessary to route data to its destination. SNA defines three types of network addressable units, namely: system services control point (SSCP), physical units (PU) and logical units (LU).

A physical unit (PU) is represented in FIG. 2 as an encircled PU. It is a portion of a device, usually programming or circuitry or both, that performs control functions for the device in which it is located and, in some cases, for other devices that are attached to the device that contains the PU. For the devices under its control the physical unit takes action during activation and at deactivation during error recovery and resetting synchronization, during testing, and during gathering of statistics on operation of the device. Each device in the network is associated with a physical unit. In the local cluster controller 4 there is a physical unit 41 and in the remote cluster control 5 there is a physical unit 51. There are also physical units in the local communication controller 2 and in the remote communication control 6.

A logical unit (LU) is a device or program by which an end user, a terminal operator, and or an input/output mechanism gains access to the network. The logical unit can be built in logic or programming associated with the terminal's sub-system stand-alone device, or an application program. As far as the network is concerned, a logical unit (LU) is an access port into the network. The logical unit may or may not be the original source. The contents of the request of the information on which the request is based may have originated at the device controlled by the logical unit. Similarly, the network sees a logical unit as a destination of a request (RU) unit. In FIG. 2 a logical unit is shown as an encircled LU. In the host processor 1 there are shown a plurality of application program logical units 13. In the local cluster controller 4, there are two logical units 42' and 43 controlling the devices 44' and 45. The cluster controller 5 contains logical units 52-54 controlling devices on loops 55-57. Each of the terminals 31-33 comprises of PUs 34-36 and LUs 37-39.

Figure 3:
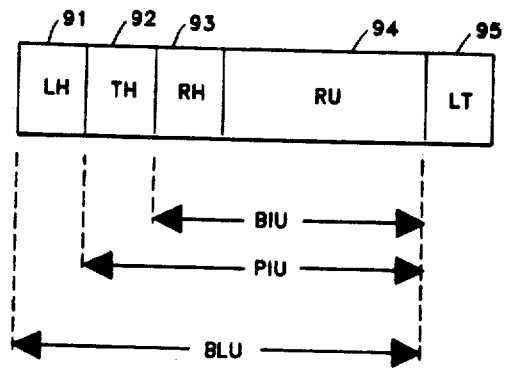
FIG. 3 shows a format for the Path Information Unit (PIU).

FIG. 3 shows the format for the basic link unit (BLU). The format includes a link header (LH) 91, a transmission header (TH) 92, a request-response unit (RU) 94, and a link trailer (LT) 95. The request-response header (RH) and the request-response unit (RU) form the basic information unit (BIU). The base information unit combines with the transmission header to form the path information unit (PIU). Finally, the path information unit combines with the link header to form the basic link unit. A basic link unit may include one or more PIUs. It should be noted that as the basic information unit travels through the various SNA levels the additional units are added. The basic information unit is the unit that travels from one end user node to another end user node in the network. The transmission header contains information which guides the BIU through the network. The transmission header comprises address information and other necessary information for transmission control. The link header and link trailer are added to the PIU to control the transmission of a PIU over a link.

As will be explained subsequently, in order to implement the network interconnect function of the present invention, VTAM and NCP are enhanced with software to form the gateway SSCP and gateway node. These enhanced devices translate information in the RU and RH fields of messages. As a result of these translations, the message is conveyed to an end user.

Figure 7:
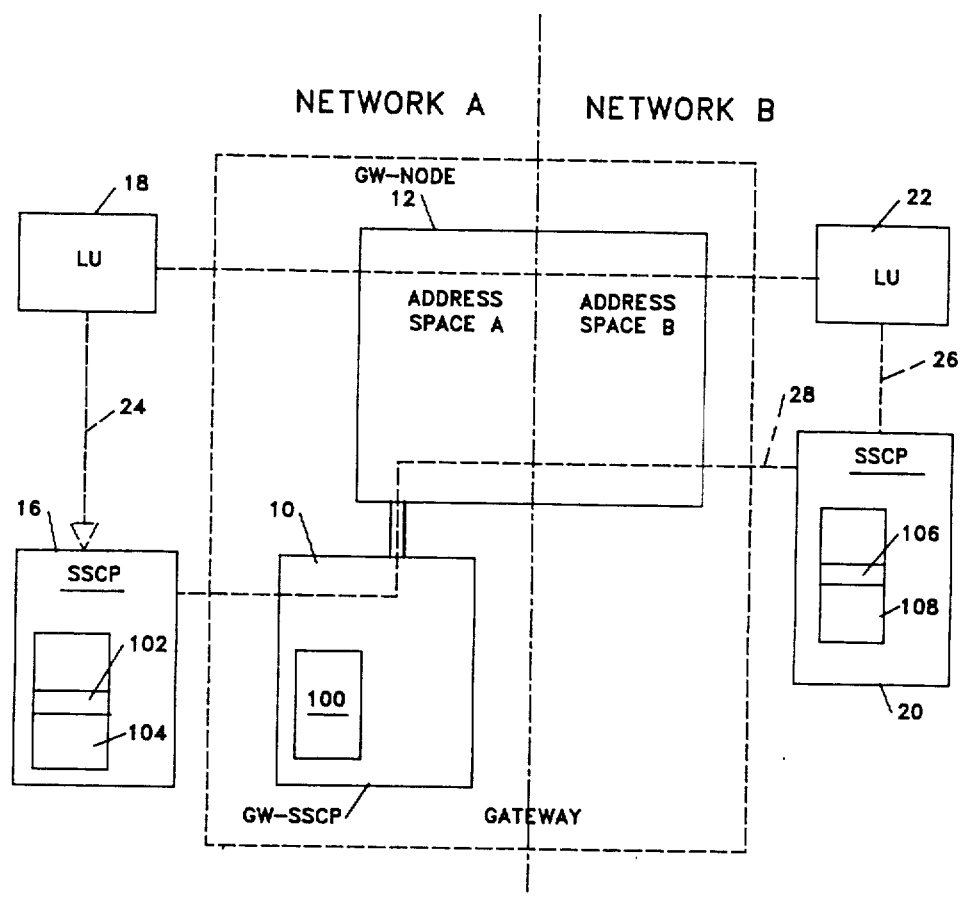
FIG. 7 shows a more detailed block diagram of the components used to provide the network interconnect function.

FIG. 7 shows a more detailed block diagram of the components which are needed to effectuate the network interconnection function. Elements in FIG. 7 that are common with elements in FIG. 1 are identified with identical numerals.

Since the common elements have already been described, this description will be limited to new elements only. New elements which are added in FIG. 7 are identified and their functions are described. Each of the networks connected by the gateway is assigned an address space in the gateway node. To this end, address space A identifies the address space for network A in gateway node 12. Similarly, address space B defines the address space for network B in the gateway node. The function of the address space is to contain alias addresses and/or names of the LU that are connected to the gateway node. Address space A contains the alias addresses and/or alias names used in network A to identify LUs of network B. Similarly, address space B contains the alias addresses and/or alias names used in network B to identify logic units (LU) in network A. Essentially, the addresses and/or names are maintained in a table look-up which is controlled by a modified NCP (details will be given subsequently). Each address space in the gateway node has a pool of network address facilities (NAF) control blocks (not shown) that can be assigned to an SSCP or LU for cross-network sessions. Associated with each NAF block there are a number of half session control blocks (HSCB) representing sessions involving the represented LU or SSCP. By way of example, an entry for an LU in network B would be recorded in address space A as follows: the NAF block would contain the alias name for the LU of network B and its real name. The HSCB block would contain the real name and address of the LU in network B. The entry in the address space B for an LU in network B would be similarly recorded. As will be explained subsequently, the NCP (network control program resource facility), which controls the gateway node, would fill in the various control blocks and as a frame traverses the gateway node the address in the transmission header is transformed using the same programming facility.

Still referring to FIG. 7, the gateway SSCP 10 is enhanced by the address and name translation means identified by numeral 100. Essentially, the address and name translation means 100 include a plurality of software developed tables which has the real address and names of addressable resources (LU and/or PU) in remote networks. The SSCP 16 is enhanced with an entry 102 in its address space 104. Address space 104 is a table which contains the addresses of all the resources LUs, etc., that are in the domain of SSCP16. SSCP16 may allow a session between the resources in its domain. The contents of entry 102 is an address for the gateway SSCP 10. The entry 102 is used to establish a cross domain initiate request (CDINIT). Similarly, element 106 is implemented in the address space 108. Address space 108 is a table containing the addresses of all the resources, LUs, etc. that are in the domain of SSCP20. Address element 106 is utilized to initiate a CDINIT request when addressable unit (LU and/or PU) in network B needs to be interconnected with an LU in network A.

Before describing the flow charts of the algorithm which is used to implement the network interconnect function, a summary of the primary request units which are used to implement the function will be given. SNA utilizes the initiate (INIT), cross domain initiate (CDINIT), response cross domain initiate (RSP-CDINIT), request network address assignment (RNAA), response request network address assignment (RSP-RNAA), and set control vector (SETCV) commands to establish a session between LUs in separately controlled networks.

The INIT command when used in the most general case requests a session initiation between any two named LUs.

CDINIT is used when the receiver of the INIT is not the owner of both LUs and contains the origin LU name, origin LU address and destination LU (DLU) name.

RSP-CDINIT is used to indicate that the requested session is authorized and contains the assigned DLU address for this session instance.

RNAA is used between the gateway SSCP and the gateway node to request alias address assignments for a particular session.

SETCV is used to send control information such as path to be activated for a particular session and the name transform from the gateway SSCP to the gateway node.

Figure 4:
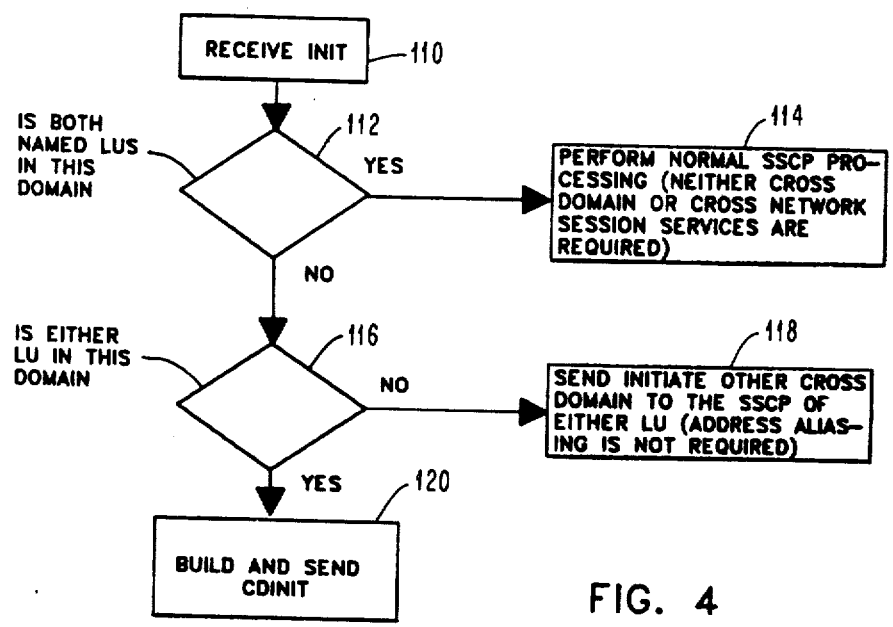
FIG. 4 shows a flow chart for an algorithm used by an SSCP to process initiate request for an LU in its own domain.

FIG. 4 shows a flow chart defining the process steps which are performed by a SSCP such as SSCP 16 or 20 (FIG. 1 and FIG. 2) for processing and initiating requests from an LU within its own domain. The first step of the process is shown in block 109. The initiate request is generated and transmitted XMIT by an LU. The SSCP receives the initiation request block 110. The program then descends into block 112. Block 112 is a decisional block and checks to see if the name of the destination LU is in the domain of the SSCP. If it is, the program moves into block 114 where it performs normal SSCP processing. This type of processing does not form part of the present invention and as such the details will not be given. However, if such detail is required, then see ACP/VTAM Programming Manual SC27-0611.

If the LU name is not in the domain of the SSCP, the program descends into block 116. Block 116 is a decisional block and the program checks to see if either LU is in its own domain. If none of the LUs are in the domain, the SSCP sends or initiates other cross domain messages to the SSCP owning the destination LU (block 118). If the destination LU is in the domain of the SSCP, the SSCP then builds and sends a CDINIT request (block 120) to the gateway SSCP.

Figure 5A:
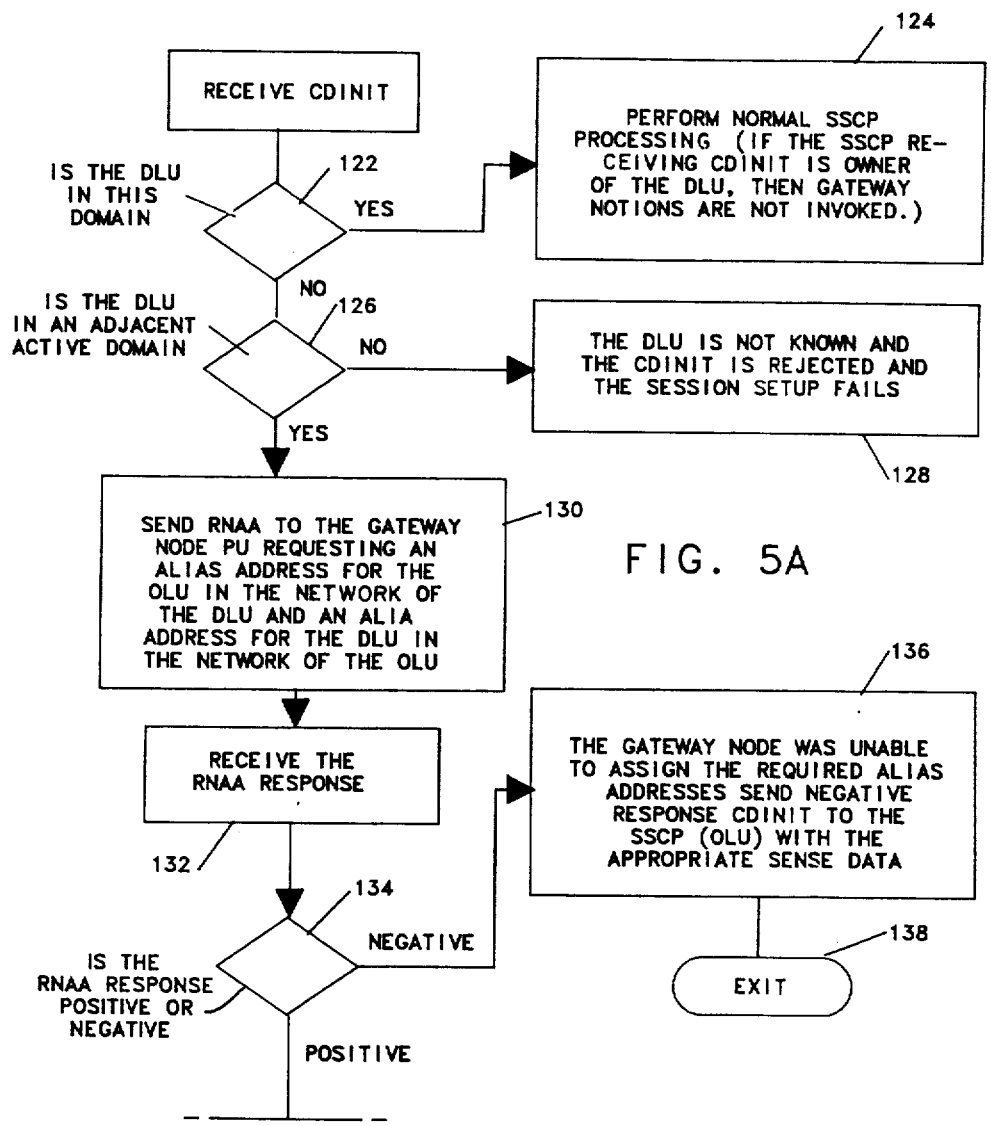
Figure 5C:
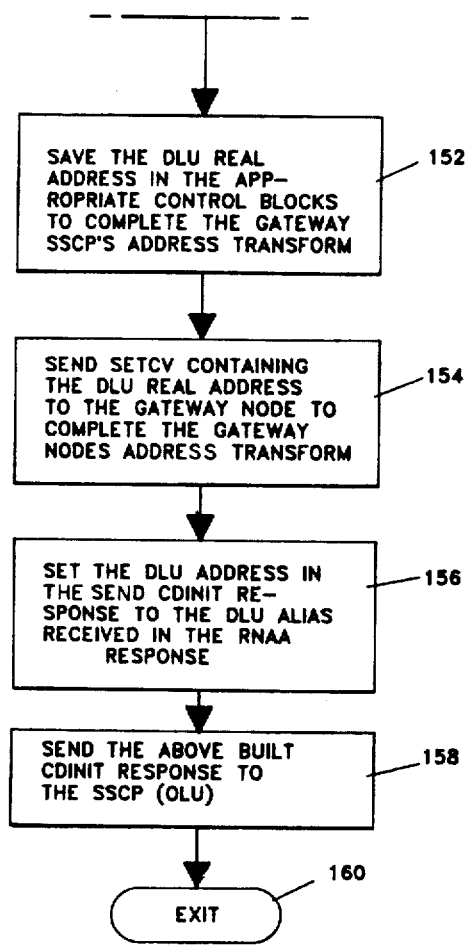

FIGS. 5A through 5C show the algorithm which is processed in the gateway to effectuate the network interconnect function. The process steps which the program performs are summarized in the respective blocks. In order to simplify the description, only a brief summary of the process steps is given, it being understood that the flow charts can be consulted for a more detailed description of the process steps. The cross domain initiate request which is prepared and transmitted from an SSCP in a network is received in the gateway SSCP.

To this end, block 121 represents the first step in the program and the gateway SSCP receives the CDINIT request. As described above, the format of the request is similar to that shown in FIG. 3 and the minimum information includes the OLU originating LU name and address and the DLU destination LU name. The program next descends into decisional block 122. In decisional block 122 the program checks to see if the named DLU is in its own domain. If it is, the program enters function block 124. If the SSCP receiving the cross domain initiate request is owner of the DLU, the SSCP then performs normal SSCP processing. The receiving SSCP determines whether or not it owns a resource (DLU) by interrogating its own internal tables.

If the DLU is not in its own domain, the program then descends into decisional block 126. In block 126 the program checks to see if the DLU is in an active domain. If it is not, the program enters block 128 wherein it rejects the CDINIT and the session setup fails. If the DLU is in an adjacent active domain, the gateway SSCP sends the RNAA command to the gateway node (block 130). The gateway SSCP uses the RNAA command to ask the gateway node for alias addresses for the OLU in the network of the DLU and an alias address for the DLU in the network of the OLU. As discussed above, this information is contained in tables that are stationed in the address space for network A and network B, respectively. After the RNAA response is received from the gateway node, block 132, the gateway SSCP via block 134 checks to see if the RNAA response is positive or negative. If the response is negative, the program enters block 136. The negative response indicates that the gateway node was unable to assign an alias address. From block 136 the program descends into block 138 where it exits.

If the RNAA response is positive, the program then enters block 140 (FIG. 5B). In block 140 the program sets up control blocks. From block 140 the program next descends into block 142. In block 142 the program performs the following function. It replaces the OLU address in the send CDINIT with the alias address received in the RNAA response. It enters the DLU alias address for the network of the OLU in the appropriate control blocks. The program then descends into block 144 where it sends cross domain initiate (CDINIT) to the next adjacent active SSCP. The program then descends into block 146 where it receives a positive or negative response from the request send in block 144. The program then descends into decisional block 148. The program checks to see if the CDINIT response is negative or positive. If it is negative, the program enters block 150. In block 150 the program resets the control block which was set up in blocks 140 and 142. The program also notifies the gateway node of the session failure. If the response is positive, the program descends into block 152 (FIG. 5C).

In block 152 the program saves the real address in the appropriate control blocks set up by blocks 140 and 142 to complete the gateway SSCP's address transformation. The program then descends into block 154 where it sends the commands containing path information, DLU real address, etc. to the gateway node. The program then descends into block 156 where it prepares a CDINT response. The program makes the address translation specified in block 156 and then sends the response prepared by block 156 to the SSCP of the originating LU (block 158). The program then descends to block 160 where it exits.

At the instant of exit the gateway SSCP now has the complete address transformed and the address contained in the SSCP-SSCP request will be translated utilizing the information contained in the control blocks built by the above CDINIT processing. Likewise, the gateway node also has a complete address transformed, and the addresses contained in the transmission headers associated with this session will be transformed utilizing control blocks built by the RNAA processing.

Figure 6B:
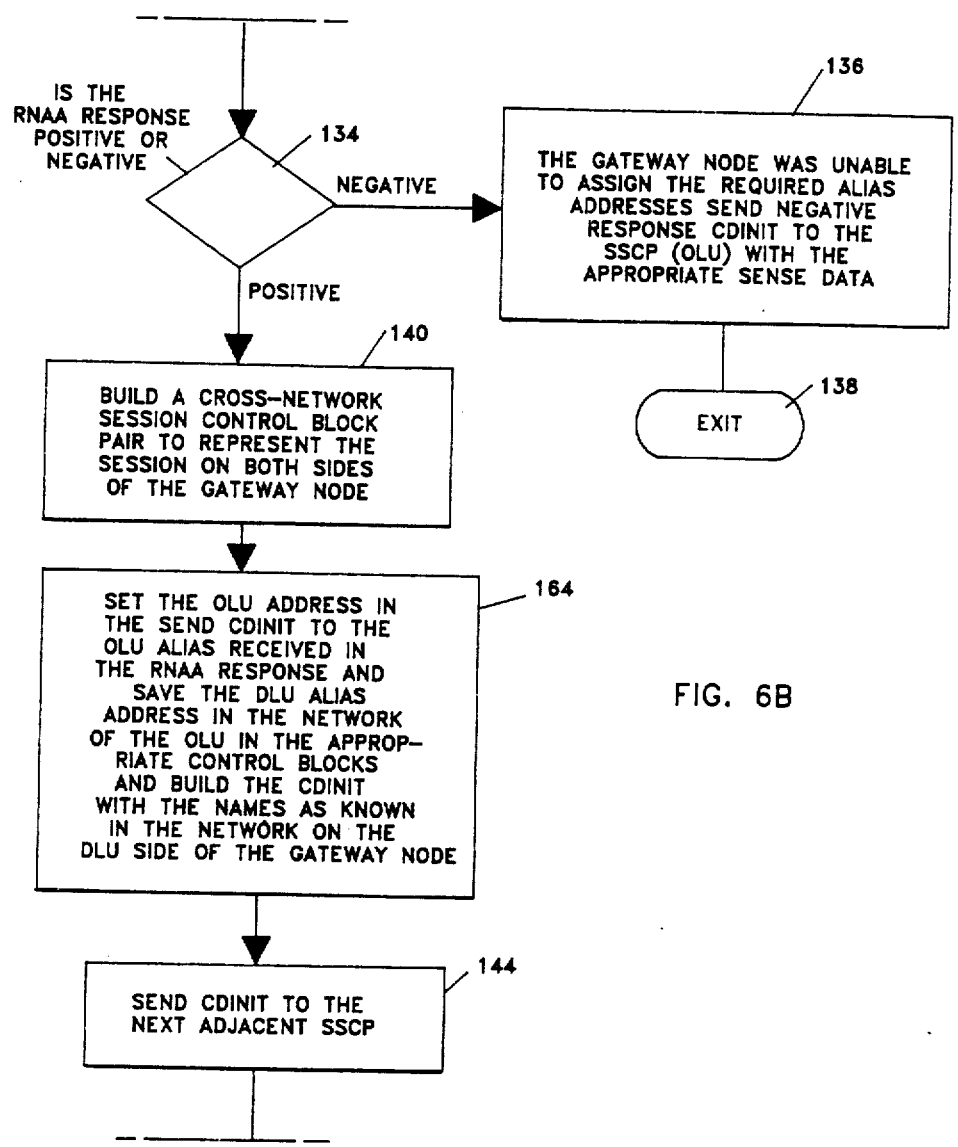

FIGS. 6A-6B show an algorithm used to interconnect networks when both the address and name alias functions are used. Common blocks in FIGS. 5 and 6 are identified by common numerals. The common blocks perform identical functions. Because the identical functions have already been described, only those blocks which perform new functions to implement the name aliasing function will be described. The crux of the name aliasing is that each network uses an alias name to identify resources in another network. By using alias names the same name can be used to identify logical units in separately controlled networks. However, when these networks are connected via the network interconnect function of the present invention, there is no need to assign new names to the resource. Instead, a unique alias name is used in the address space of each of the attached networks, and it is the duty of the gateway SSCP to make the proper name translaton during the establishment of a session between two LUs.

The new blocks in FIGS. 6A-6C which implement the name translation functions are blocks 162, 164, 166, and 168. In block 162, the program derives the names as known on the DLU side of the gateway node. The names are recoeded in the gateway SSCP and by way of a table look-up the gateway SSCP can derive the appropriate name.

In block 164 the program includes the names as known in the network on the DLU side of the gateway in the CDINIT.

In block 168 the gateway SSCP sends the real name transformed to the gateway NCP.

IN block 170 the program sets the destination LU (DLU) in the CDINIT response to the DLU alias address received from the gateway node in the RNAA response which had been saved in block 164.

FIG. 8 shows an alternative approach for representing the steps which must be performed in the gateway SSCP and the gateway node in order to effectuate the network interconnect function. In the figure it is assumed that two networks will be interconnected. However, the invention is intended to interconnect more than two networks. It is also assumed that LU 1 (Network A) wishes to enter into a session with LU 2 (Network B). The square blocks on the top of the page represent the various components. Naming the blocks from left to right, LU 1 represents a resource in network A, SSCP 1 represents the control point for network A, the gateway SSCP and gateway node represent the interconnected device of the present invention and SSCP 2 and LU 2 represent the control point and logical unit, respectively, in network B. The representation in FIG. 8 is often referred to as a flow diagram in contrast to the flow chart of FIGS. 5A through 6C.

The directions in which the messages flow are indicated by the arrowheads. For example, the command INITIATE (LUX) flows from the logical unit (LU 1) to its own SSCP 1. As before, the INITIATE commands indicate that (LU 1) request a session with a resource named (LUX). The real name of the LU that LU 1 wants to enter into session with is LU 2. However, network A already has a logical unit by the name of LU 2 (not shown). Therefore, LU 2 is known with the alias name LUX in network A.

The order of the flow is sequential. This means that step 172 is followed by steps 174, 176 and so on. Other commands which are represented in FIG. 8 and were not previously described are the "Bind" flow. This flow is issued when an LU is ready to go into session with another LU. The "Bind" carries information peculiar to each LU. The session starting flow is prepared and sent by an LU to its controlling SSCP. The cross domain commands are generated and are sent between SSCPs.

The rest of the flow is self-explanatory, and a detailed description of each flow will not be given. Suffice it to say that the SSCP 1 sends a cross domain initiate request (CDINIT) to the SSCP specified in its table as the owner of LUX which in this case is the gateway SSCP. The cross domain initiate includes a mode name, the class of service name, the name of LU 1, the address of LU 1, and the name LUX. Since the gateway SSCP has no definition of LUX, it uses a name translation function and determines that LUX corresponds to LU 2 in network B owned by SSCP 2. Using the destination network identifier the name translation tables are also searched to find the alias name used in the network B for LU 1, the class of service name in network B, and the mode name in network B. All of this information is returned to the gateway SSCP.

Note that the gateway SSCP knows the requested logical unit is in another network. The gateway SSCP sends a request network address assignment (RNAA) command asking the gateway node to allocate a pair of alias addresses for the session. The network identifiers and names of the logical units are included in the RNAA, along with the network address of LU 1. The gateway node assigns an address in network A to represent LU 2 and an address network to represent LU 1. These alias addresses are returned in response to the RNAA.

Before sending CDINIT to SSCP 2, the gateway SSCP changes the name fields to carry the mode, class of service, original LU, and destination LU names understood in the name space of network B. The original LU address is changed to the alias address assigned for LU 1 in the network B sub-area of the gateway node. As CDINIT passes through the gateway node, one of the transmission headers is changed to represent the gateway SSCP to SSCP 2 session in network B. SSCP 2 processes the CDINIT as the owner of LU 2 and returns the address of LU 2 in the response.

After receiving the response to CDINIT, the gateway SSCP has all the information required to complete the transform of the gateway node. The network address of LU 2 in network B from the response completes the address mapping started with RNAA. Both alias and real names of the two logical units are known from CDINIT and the name translation tables and the class of service name in network A resolves to the list of virtual routes for the session path between the gateway node and LU 1. This list is needed when BIND from the primary LU arrives at the gateway node. A set control vector request gives the address of LU 2, the LU name transform, and the virtual route list of the gateway node. All of this information is used by the gateway node when it receives BIND.

Before forwarding the send initiate response to SSCP 1, the gateway SSCP changes the destination LU address field to carry the alias address for LU 2 in the network sub-area of the gateway node. The class of service name field carries the name that applies in network A. SSCP 1 handles the response as for a cross domain session. It sends a response to LU 1 for the original initiate, resolves the mode name session parameters, and sends the session parameters to the other SSCP in cross-domain control initiate (CDCINIT).

Except for BIND processing, the rest of the session setup sequence is just a matter of rerouting requests to the gateway SSCP after translating name and address fields, as needed, and changing transmission headers in the gateway node. When BIND arrives at the gateway node, the virtual route list sent on the SET CV request is used to select and activate a route from the gateway node to the sub-area node for LU 1. The same request used by host node to activate routes for use by the gateway node before BIND is sent to LU 1, and the logical unit name field is in the BIND or change to carry the name understood by LU 1. The primary LU name is changed from LU 2 if a negotiable BIND is used to allow the secondary LU to return suggested BIND parameters to the primer LU, the gateway node does a reverse translation of LU names in the BIND response. This ends the description of the invention.

Although the present invention is implemented in the gateway node and the gateway SSCP, there is no limitation in the architecture that would prevent it from implementation in a single device, be it a communication controller or a host computer.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. In an independently controlled computer network having a plurality of addressable resources coupled to a switching node adapted for selectively monitoring frames generated at each network addressable resource and when requested establishing communications sessions between respective resources in said network an improved communications means for interconnecting a plurality of said independently controlled computer networks to enable an originating addressable resource in a first network to communicate with a destination addressable resource in a second network, said communications means comprising:

- first means at the originating addressable resource of said first network for generating a first session request message including a name for the originating addressable resource, an address for the originating addressable resource, and a name for the destination addressable resource;
- second means, at the switching node of the first network, responsive to the first session request message and for generating and transmitting a second message carrying the names and addresses set forth in the first message; and
- an interconnecting means coupling the first and second networks said interconnecting means responsive to the second message for establishing a first session between the originating addressable resource and a pseudo-addressable destination resource at said interconnecting means, for establishing a second session between said pseudo-addressable destination resource and the addressable destination resource recited in said message and located in the second network and thereafter replacing alias names and alias addresses used to identify the pseudo-addressable destination resource with the actual names and addresses of the actual addressable destination resource in all messages traversing the first and second sessions, thereby causing messages originating at the originating addressable resource to be delivered to the destination addressable resource.

2. The communication means of claim 1 wherein the second means includes a host computer having a table containing entries for resources being controlled by said host computer and at least one entry representing the address of said interconnecting means.

3. The communications means of claim 1 wherein the interconnecting means includes a gateway controller and
   a gateway node connected to the gateway controller.

4. The communications means of claim 3 wherein the gateway node includes at least one address space for each interconnected network.

5. The communications means of claim 4 wherein each address space includes alias addresses and names representative of addresses and names given to resources of another network.

6. An interface for interconnecting independently controlled computer networks so that addressable resources of one network may enter into a session and exchange messages with addressable resources of another network said interface including:

- first means responsive to a session initiate request message, said message having an address field with the address of an originating addressable resource, a first name field with the name of the originating addressable resource and a second name field with the name of the distination addressable resource, with said first means
- being operable for providing alias names and addresses in each network for the names and addresses contained in the session initiate request message, for determining the actual address for the destination addressable resource and for informing each network of the assigned alias names; and
- second means coupled to the first means for selectively replacing the alias names and alias addresses with the actual names and actual addresses in messages passing through said interface and carrying the alias names in a destination name field and the alias addresses in a destination address field.

7. A computer telecommunication network system having a plurality of independently controlled networks with each network having at least one host computer controlling a plurality of addressable resources, an apparatus for interconnecting the networks so that addressable resources in a first network communicate with resources in a second network said apparatus comprising:

- means, at an originating addressable resource of said first network, for generating a session service request command message, said command message having an address field and a name field for an originating resource and a name field for a destination resource;
- storage means, at said first network, having a first address space with alias names for naming in said first network addressable resources physically connected to the second network and a second address space with alias names for naming in said second network addressable resources physically connected to the first network; and
- control means coupled to the storage means and responsive to the command message for correlating an address and/or name in said command message with an alias address and/or name in said storage means and transmitting a message containing the alias name and/or alias address assigned to identify in said first network a resource named in the request command message and connected to the second network.

8. The apparatus of claim 7 further including a communication channel for interconnecting the networks to enable the flow of information therebetween.

9. A method for interconnecting independently controlled computer networks so that logical units (LUs) in one network communicate with LUs in another network; said method comprising the following steps:

- at each network, providing an address translation function;
- preparing and forwarding from an originating LU a session initiate request message; said message including an address field with the address of an originating LU, a name field with the name of an originating LU, and a second name field with the name of a destination LU;
- receiving the session initiate request message at said address translation function;
- selectively assigning an alias name and an alias address for each name and address in said session initiate request message;
- preparing and forwarding to a controller of the originating LU a response message including the alias name and alias address assigned to a logical unit (LU) defined in said message but connected to another network; and
- receiving, at the controller of the originating LU the response message and thereafter using the alias name and alias address to send messages to the destination logical unit (LU) named in the session initiate request message.

10. The method of claim 9 further including the steps of receiving at said address and translation functions all messages containing alias addresses and alias names;
   replacing alias names and alias addresses with actual network names and addresses and thereafter retransmitting the message to the network in which the named LU resides.

11. A method for interconnecting independently controlled computer communications networks comprising the following steps:

preparing and transmitting from a first network a session service request command message;

said message having a name and address for an originating logical unit (LU); and a name for a destination logical unit (LU) at a control computer of said first network, receiving an buffering the message;

determining the actual destination address for the named destination LU;

assigning alias names and alias addresses for the names and addresses in said message;

establishing a first session between the originating LU and the alias names and addresses in said control computer;

establishing a second session between the alias names and addresses of the control computer and the actual destination address of the destination LU in said second network;

and forwarding respective messages of the alias names to use to inform the first and the second networks when communicating with logical units named in said message.

12. The method recited in claim 11 further including the steps of preparing and transmitting on the established session from the originating LU end user messages on the established session;

receiving the end user messages at the control computer; and replacing alias addresses and names with actual addresses and names.

* * * * *

UNITED STATES PATENT AND TRADEMARK OFFICE
CERTIFICATE OF CORRECTION

PATENT NO. : 4,677,588
DATED : June 30, 1987
INVENTOR(S) : Benjamin et al

It is certified that error appears in the above-identified patent and that said Letters Patent is hereby corrected as shown below:

Claim 6, Col. 13, line 58, change "distination" to -- destination --.

Claim 11, col. 15, line 11, delete ";" line 15, change "an" to -- and --.

Signed and Sealed this

Twenty-eighth Day of June, 1988

Attest:

DONALD J. QUIGG

*Attesting Officer*  *Commissioner of Patents and Trademarks*